Inventors
Norman V. S. Knibbs
Edward G. S. Thyer
By Stevens, Davis, Miller & Mosher
Attorneys

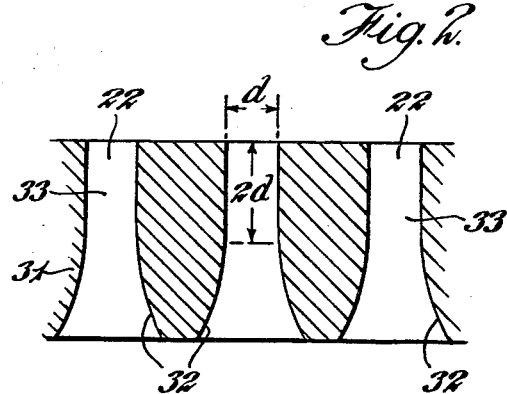
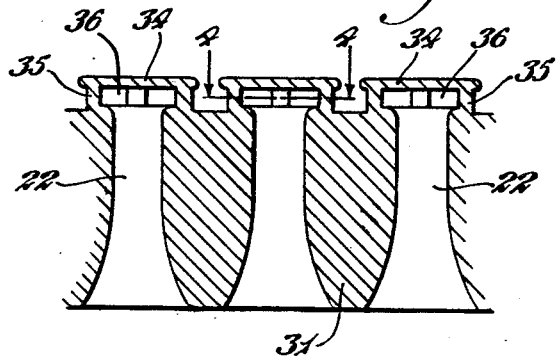
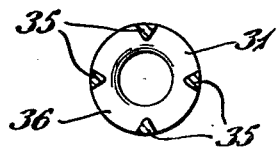

United States Patent Office 3,192,644
Patented July 6, 1965

3,192,644
FLUIDIZED BED APPARATUS
Norman Victor Sydney Knibbs and Edward George Stanley Thyer, Borough Green, England, assignors to Fawkham Developments Limited, Borough Green, England
Filed Mar. 2, 1962, Ser. No. 177,026
1 Claim. (Cl. 34—57)

This invention relates to fluidized bed apparatus in which particles forming a bed of finely divided solids are maintained in a state of motion by the upward flow of air or gas through the bed, so that the bed takes on many of the properties of a boiling liquid.

The bed is usually supported on a wire mesh, a grid or a porous or perforated plate through which the air or gas passes, the openings or perforations in the mesh, grid or plate frequently being much larger than the solid particles. The high gas velocity is relied on to keep the solid particles from passing downwardly through the openings or perforations, but the "boiling" action in the bed gives rise to a pulsating gas flow, with the result that there are short periods of low gas velocity, or even of reversed gas flow through some of the openings or perforations, and small quantities of solids can pass downwardly through the said openings or perforations.

The object of the present invention is to reduce or eliminate such downward movement of solids through the openings or perforations.

The present invention consists in fluidized bed apparatus comprising a casing in which a fluidized bed of finely divided solid matter is produced above an apertured supporting plate by an upward flow of air or gas through the apertures in said supporting plate, wherein the apertures in the supporting plate are constituted by a plurality of jet orifices each having an upwardly convergent entry portion at its lower end and a cylindrical bore at its upper end, the length of the cylindrical bore being equal to at least twice the diameter thereof.

The invention is hereinafter described with reference to the accompanying drawings, in which:

FIGURE 2 is a sectional elevation, on a larger scale, of a portion of the supporting plate shown in FIGURE 1;

FIGURE 3 is a sectional elevation, similar to FIGURE 2, showing a modification; and FIGURE 4 is a section on the line 4—4 of FIGURE 3.

Figure 1:
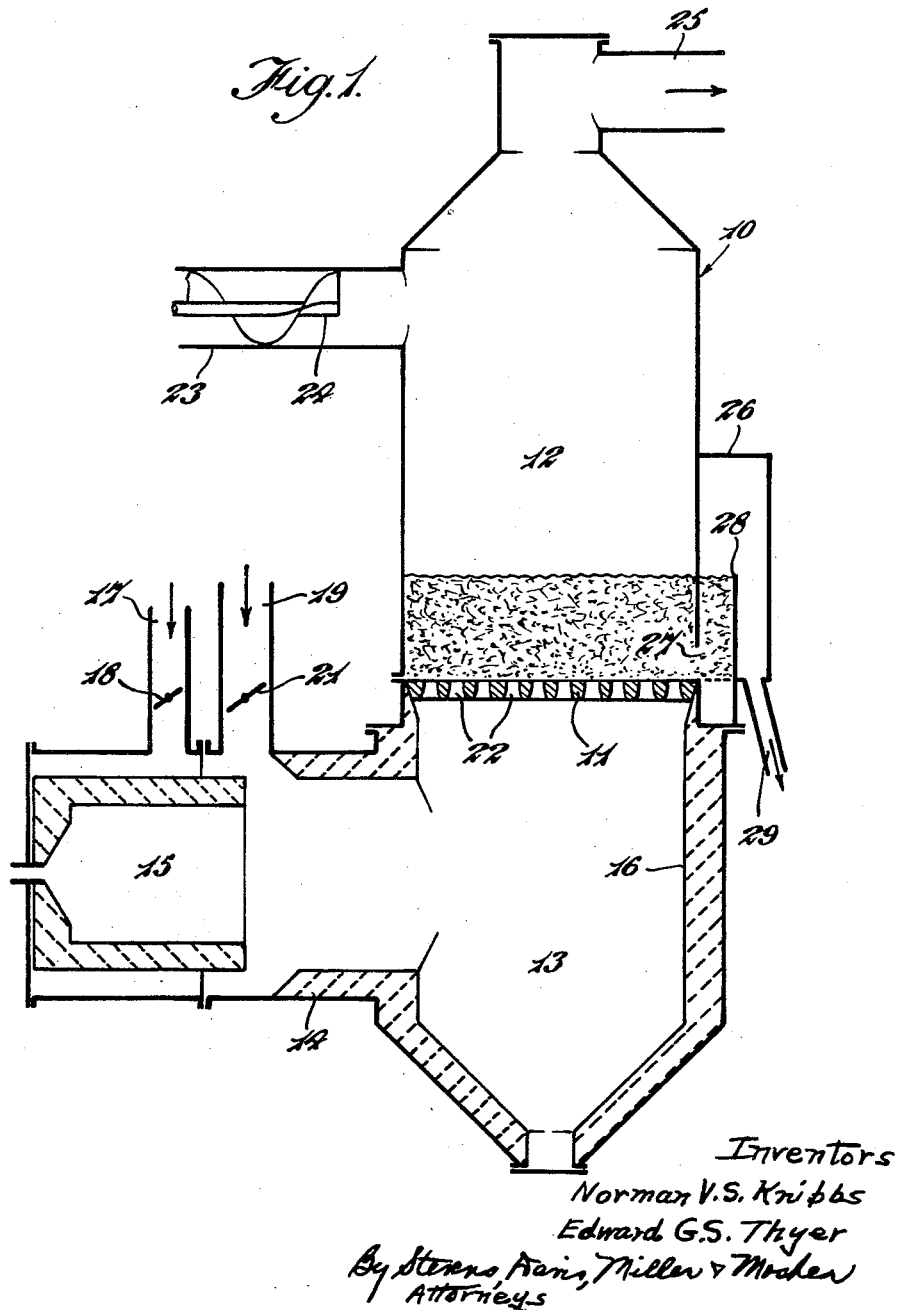
FIGURE 1 is a diagrammatic cross section of one form of fluidized bed apparatus according to the invention.

Referring to FIGURE 1, the fluidized bed apparatus comprises a casing 10 divided by a supporting plate 11 into an upper chamber 12 and a lower chamber 13. The lower chamber has a side extension 14 in which is provided a combustion chamber 15, the said lower chamber having a refractory lining 16. Air for the combustion of fuel in the combustion chamber 15 is supplied through a duct 17, the supply being controlled by a valve 18, and further air or gas is supplied at high velocity through a duct 19, controlled by a valve 21.

The supporting plate 11 is formed with jet orifices 22 to enable the products of combustion from the combustion chamber 15, and the air or gas from the duct 19 to flow upwardly therethrough, the orifices 22 being distributed over the whole area of the plate with a close spacing. Solid material in particle form is fed into the upper chamber 12 through a horizontal duct 23 in which is provided a screw conveyor 24, and the gases passing upwardly through the supporting plate are led away, preferably to dust collecting apparatus, through a duct 25. A discharge box 26 at one side of the upper chamber 12 is connected to that chamber by way of an opening 27 immediately above the supporting plate 11, a weir 28 being provided in the discharge box and the outlet 29 from the latter being on the side of the weir remote from the opening 27.

Solid material fed into the upper chamber 12 through the duct 23 forms a bed on the supporting plate 11, the bed being maintained in a fluidized condition by the gases passing upwardly through the jet orifices 22, the said solid material eventually passing through the opening 27 and over the weir 28 to the outlet 29. Due to the fluidized condition of the bed, as a result of which it acts in many respects like a boiling liquid, the height of the weir determines the depth of the bed.

FIGURE 2 shows one form of jet orifice 22 according to the invention. Each of the said orifices 22 has an upwardly convergent entry portion 32 at its lower end and a cylindrical bore 33 at its upper end, the length of the bore 33 being equal to twice the diameter of the said bore as shown in the drawing, or being greater than twice that diameter.

To further assist in preventing the finely divided solid material from passing downwardly through the jet orifices 22, shields 34 may be provided over the upper ends of the said orifices as shown in FIGURES 3 and 4, the shields 34 being of circular shape and being supported in spaced relation to the upper ends of the orifices 22 by webs 35 between which are provided arcuate slots 36.

It is found that, using jet orifices of the shape described with reference to FIGURE 2 the solid particles can be retained above the bed support with a much lower gas velocity than when a wire mesh, grid or porous or perforated plate is used. It is believed that the reason for this is that the periods of low velocity or reverse flow are very short, and that such periods are too short to allow the solid particles to pass downwardly through the cylindrical portions of the orifices before the velocity returns to normal and is able to again carry them upwardly into the bed.

The shape of the convergent portions 32 of the orifices 22 may be as shown in the drawing, this shape being that of a standard 18A nozzle as defined in British Standard Code 1042:1943, or the said convergent portions may be conical or of other convergent shape.

The invention may be applied to fluidized bed apparatus of forms other than that specifically described herein, and apparatus embodying the invention may be used for any of the purposes for which fluidized bed apparatus is normally used, such as calcination, oxidation, reduction and drying of the solids.

We claim:

Fluidized bed apparatus comprising a casing having a supporting plate therein, said supporting plate dividing said casing into an upper chamber and a lower chamber, means connected to said upper chamber to feed solid material in particle form thereinto which is supported in said upper chamber on said supporting plate as a bed, said supporting plate having disposed therein a plurality of apertures each having an upwardly convergent portion communicating with said lower chamber and a cylindrical bore integral with the upper end of said convergent portion of the aperture, the length of said cylindrical bore being at least twice the diameter thereof, means connected to said lower chamber to supply a fluidizing medium which passes through said apertures into said bed to subject same to a fluidizing state, shield means disposed above each aperture to cover same, web means disposed between said shield means and said supporting plate around each aperture, said web means being spaced from each other to define slots so that said fluidizing medium passes from said apertures into said bed.

References Cited by the Examiner
UNITED STATES PATENTS

| | | | |
|---|---|---|---|
| 1,019,958 | 3/12 | Hannam et al. | 34—57 |
| 2,608,474 | 8/52 | Gilliam | 34—57 |
| 2,763,478 | 9/56 | Parry | 34—57 |
| 3,040,439 | 6/62 | Frost | 34—57 |
| 3,052,990 | 9/62 | Tailor | 34—57 |

FOREIGN PATENTS

| | | |
|---|---|---|
| 979,147 | 12/48 | France. |
| 729,571 | 5/55 | Great Britain. |

PERCY L. PATRICK, *Primary Examiner.*

NORMAN YUDKOFF, *Examiner.*